United States Patent [19]
TaeDuk

[11] Patent Number: 5,285,646
[45] Date of Patent: Feb. 15, 1994

[54] METHOD FOR REVERSING A COMPRESSOR IN A HEAT PUMP

[75] Inventor: Kim TaeDuk, Taekoo, Rep. of Korea

[73] Assignee: Samsung Electronics Co., Ltd., Suwon, Rep. of Korea

[21] Appl. No.: 965,533

[22] Filed: Oct. 23, 1992

Related U.S. Application Data

[63] Continuation of Ser. No. 709,204, Jun. 3, 1991, abandoned.

[30] Foreign Application Priority Data

Jun. 1, 1990 [KR] Rep. of Korea ............... 90-8133

[51] Int. Cl.⁵ .................................... F25B 1/00
[52] U.S. Cl. ..................... 62/115; 62/228.4; 62/155; 62/158; 62/234; 62/324.5
[58] Field of Search ............ 62/153, 139, 228.1, 62/228.4, 234, 324.1, 324.5, 324.6; 318/256, 257, 284, 285; 417/53, 12, 44, 45, 326

[56] References Cited

U.S. PATENT DOCUMENTS 4,128,854  12/1978  Ruminsky ..................... 62/158
4,248,053  2/1981   Sisk ............................ 62/158

*Primary Examiner*—John Sollecito
*Attorney, Agent, or Firm*—Burns, Doane, Swecker & Mathis

[57] ABSTRACT

An air conditioning system includes a compressor which is reversed in order to switch from a heating mode to a defrost mode, or in order to switch between heating and cooling modes. Prior to being reversed, the compressor is automatically reduced to a slower speed greater than zero for a predetermined time period to minimize damage and noise when reversal occurs. The compressor is reversed while at the slower speed when switching the system to a defrost mode. When switching between heating and cooling modes, the compressor speed is first reduced to the slower speed for the first predetermined time period and then to zero speed for a second predetermined time period, before the compressor is reversed.

11 Claims, 6 Drawing Sheets

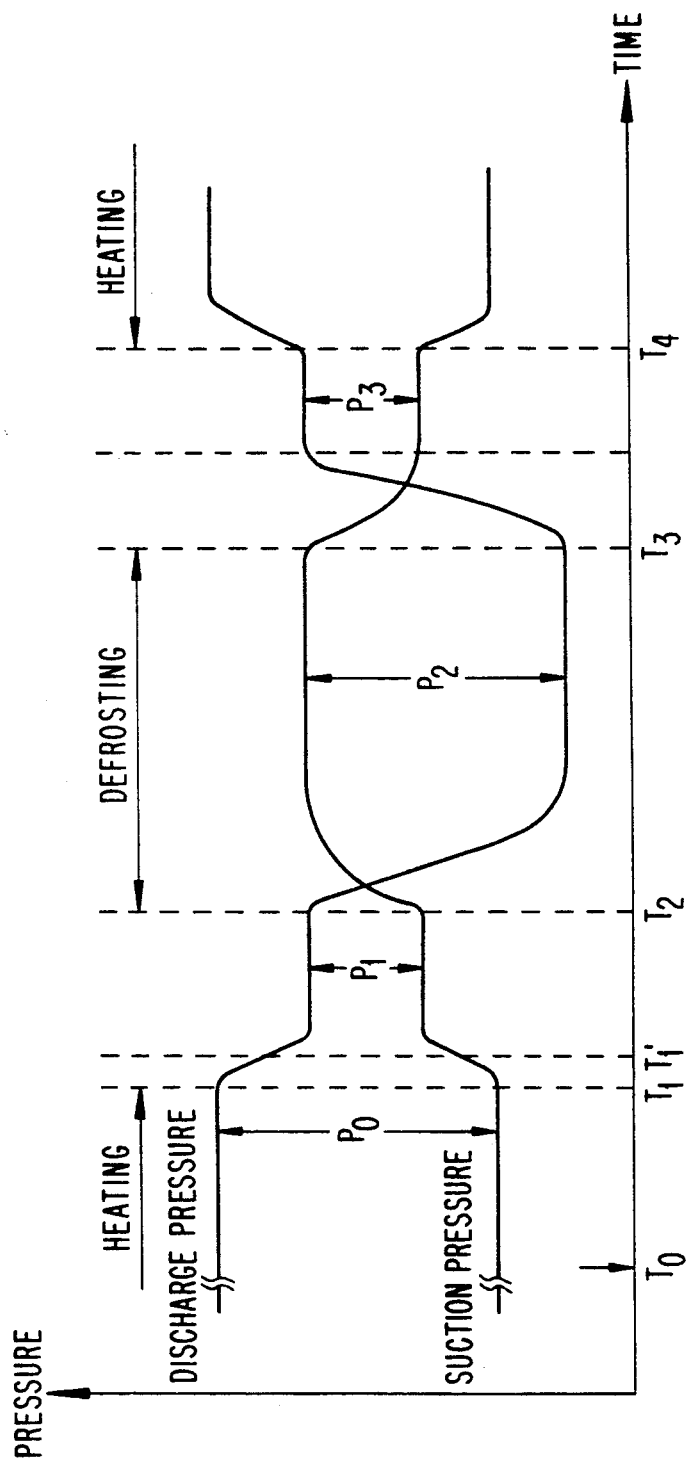

METHOD FOR REVERSING A COMPRESSOR IN A HEAT PUMP

This application is a continuation of application Ser. No. 07/709,204, filed Jun. 3, 1991 now abandoned.

BACKGROUND OF THE INVENTION

1. Field of the Invention

The present invention relates to a method for controlling a compressor in an air conditioner, and more particularly to a method for controlling a compressor in an air conditioner so as to reduce the difference between discharge pressure and suction pressure in the compressor.

2. Description of Prior Art

Referring to FIG. 1, there is shown an example of conventional air conditioners. In the air conditioner, room temperature is sensed by a room temperature sensor 10; an outdoor heat exchanger temperature is sensed by a temperature sensor 1'; an indoor heat exchanger temperature is sensed by a temperature sensor 2'. An invertor 8 controls amount of circulating refrigerant through a compressor 5 to reverse the operation of compressor 5 from the cooling mode to the heating mode, or vice versa. At this time, invertor 8 outputs as high a frequency voltage as possible, in order to shorten the operation mode reversal time in each reversal of the operation mode. Thus, high speed rotation of compressor 5 could be possible, thereby reducing operation mode reversal times for cooling, heating and defrosting operations.

However, although reducing the operation mode reversal time, the high speed rotation of compressor 5 resulted from the above-mentioned high frequency voltage outputted from invertor 8 causes a considerably high pressure difference between discharge pressure and suction pressure in the compressor. As a result, refrigerant of high pressure returns to compressor 5, thereby generating high pressure noise. If such high pressure refrigerant flows into compressor 5 at this time, the compressor may be damaged.

A representative example of attempts to solve the above-mentioned problems is disclosed in Japanese Patent Laid-open Publication No. 57-150763. A heat exchanger temperature sensor and a room temperature sensor sense heat exchanger temperature and room temperature and supply signals corresponding to the sensed temperatures to a temperature control circuit, respectively. When a difference between the two temperatures is no more than a predetermined value the temperature control circuit applies a signal to a switch for a compressor drive circuit, which switch then turns on. A first timer which is connected to the switch in series via a contact of a second relay produces conducting time. As the first timer counts a predetermined time, a first timer switch turns on, so that the second relay connected to the first timer switch in series via a second timer switch can conduct. Conducting of the second relay makes the other contact of second relay turn off, so that the contact of first relay turns off, thereby causing the compressor connected thereto in series to stop. Such conventional device thus involves stopping the compressor for a predetermined time before the reversal of operation mode.

SUMMARY OF THE INVENTION

An object of the invention is to solve the above mentioned problems encountered in the prior art and to provide a method for reducing the difference between discharge pressure and suction pressure in a compressor by driving the compressor at low speed just before the reversal of the operation mode.

In order to accomplish the object, a control method of the present invention comprises counting a predetermined time by the timer when an operation mode reversal signal has been sensed by a sensor attached to a heat exchanger. When the predetermined time elapses, an invertor outputs alternating current (AC) voltage of low frequency so that the difference between discharge pressure and suction pressure in the compressor is reduced. After a predetermined time elapses during the driving of compressor under the condition that the difference between discharge pressure and suction pressure is maintained low, the reversal of operation mode is carried out.

BRIEF DESCRIPTION OF THE DRAWINGS

The above and the other objects, features and advantages of the present invention will be more clearly understood from the following detailed description taken in conjunction with the accompanying drawings, in which:

FIG. 2A is a fragmentary view of FIG. 2 after the reversing valve has been reversed;

FIG. 3 depicts a first operation characteristic curve when using the invention of FIG. 2 to switch between heating and defrosting modes;

DETAILED DESCRIPTION OF THE PREFERRED EMBODIMENTS

Figure 1:
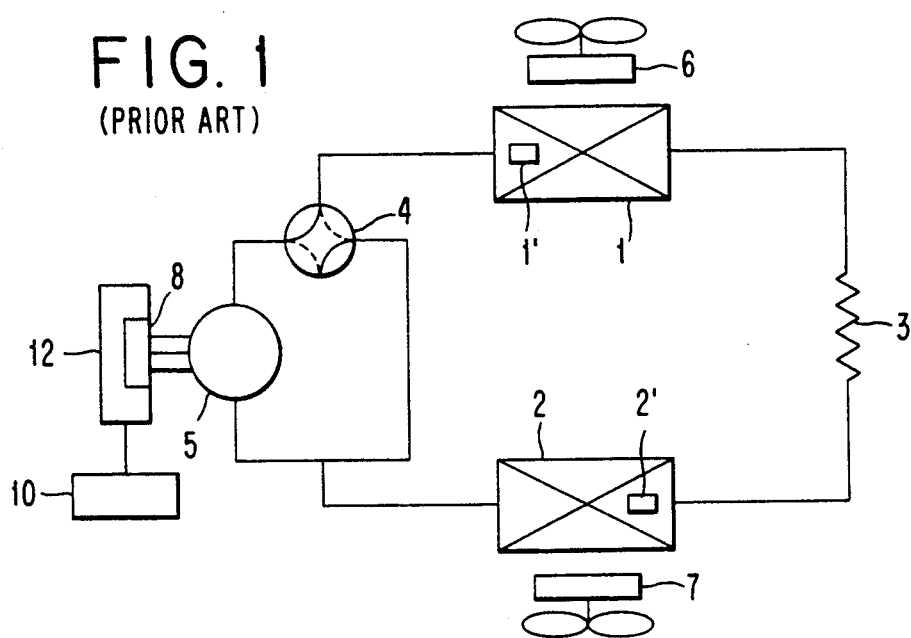
FIG. 1 is a schematic block diagram of a conventional air conditioner.
Figure 2:
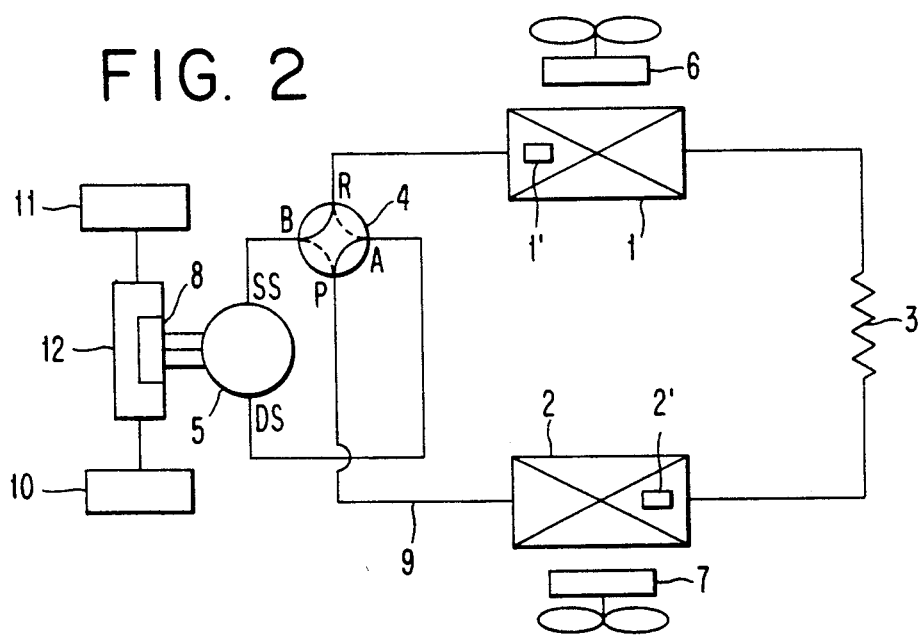
FIG. 2 and 2A is a schematic block diagram of an embodiment according to the present invention.

Referring to FIG. 2 there is shown an air conditioner in accordance with the present invention which includes an indoor heat exchanger 2, a compressor 5, a four-way reversing valve 4 and an outdoor heat exchanger 1, the four components being intercoupled in series via refrigerant tubes to form a refrigeration circuit. Temperature sensors 2, and 1, are attached to indoor and outdoor heat exchangers 2 and 1 respectively. Temperature sensors 1' and 2' sense temperatures and supply temperature signals to a microprocessor 12, respectively. To microprocessor 12, a room temperature sensor 10, a timer 11 and an invertor 8 are connected, which invertor 8 is also connected to compressor 5.

Figure 5:
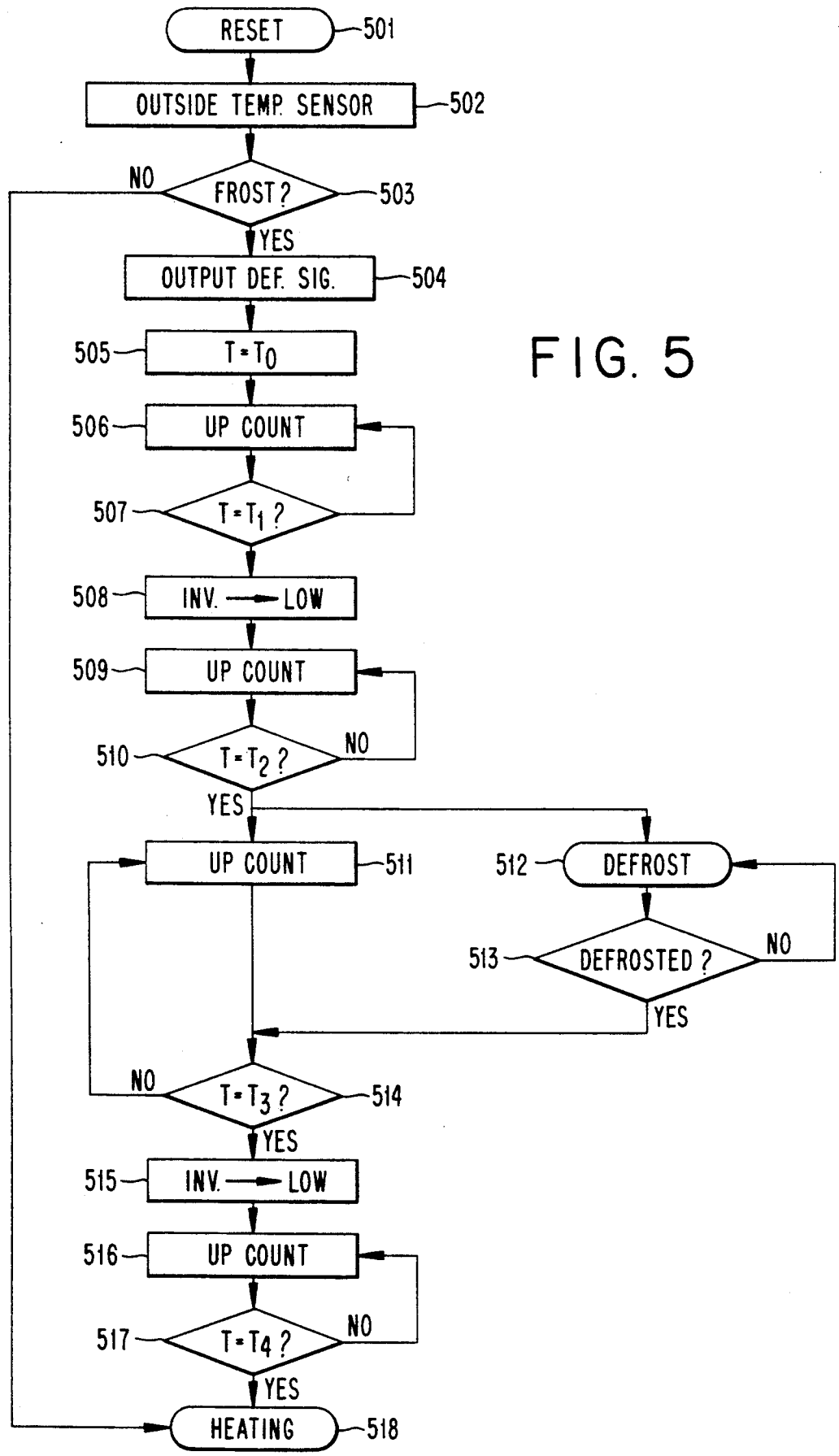
FIG. 5 is the flow chart illustrating the process of FIG. 3.

FIG. 5 is a flow chart illustrating a process for controlling compressor in the heating operation mode in accordance with an embodiment of the present invention. The air conditioner is initially reset by receiving electric power. Thereafter, as the air conditioner is driven in its heating operation mode, compressor 5 is driven in its heating operation mode by high frequency voltage outputted from invertor 8, while maintaining the difference PO between the pressure of discharge-side DS and the pressure of suction-side SS in compressor 5 (step 501).

At this time, refrigerant is introduced into R-side of a four-way reversing valve 4, discharged from B-side of the valve and then compressed in compressor 5. After being compressed, the refrigerant of high pressure and high temperature gaseous state is introduced into A-side of a four-way reversing valve 4, discharged from P-side of the valve and then condensed in an indoor heat exchanger 2. As condensed, the refrigerant emits heat into the room to warm atmosphere of the room. Then, the refrigerant flows into an outdoor heat exchanger 1 via a capillary tube 3. In outdoor heat exchanger 1, the refrigerant is changed into gas of low pressure by absorbing heat from outside atmosphere. If the heat absorption is not efficiently carried out due to frosting of outdoor heat exchanger 1, the temperature of outdoor heat exchanger 1 cannot be lower than a predetermined temperature. This can be sensed by temperature sensor 1' attached to outdoor heat exchanger 1, which sensor then supplies a frost signal to microprocessor 12 (steps 502 and 503). On the other hand, the refrigerant which absorbed heat from outdoor heat exchanger 1 is introduced into R-side of a four-way reversing valve 4.

Figure 2A:
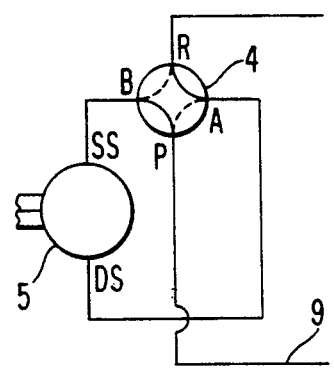
Figure 4:
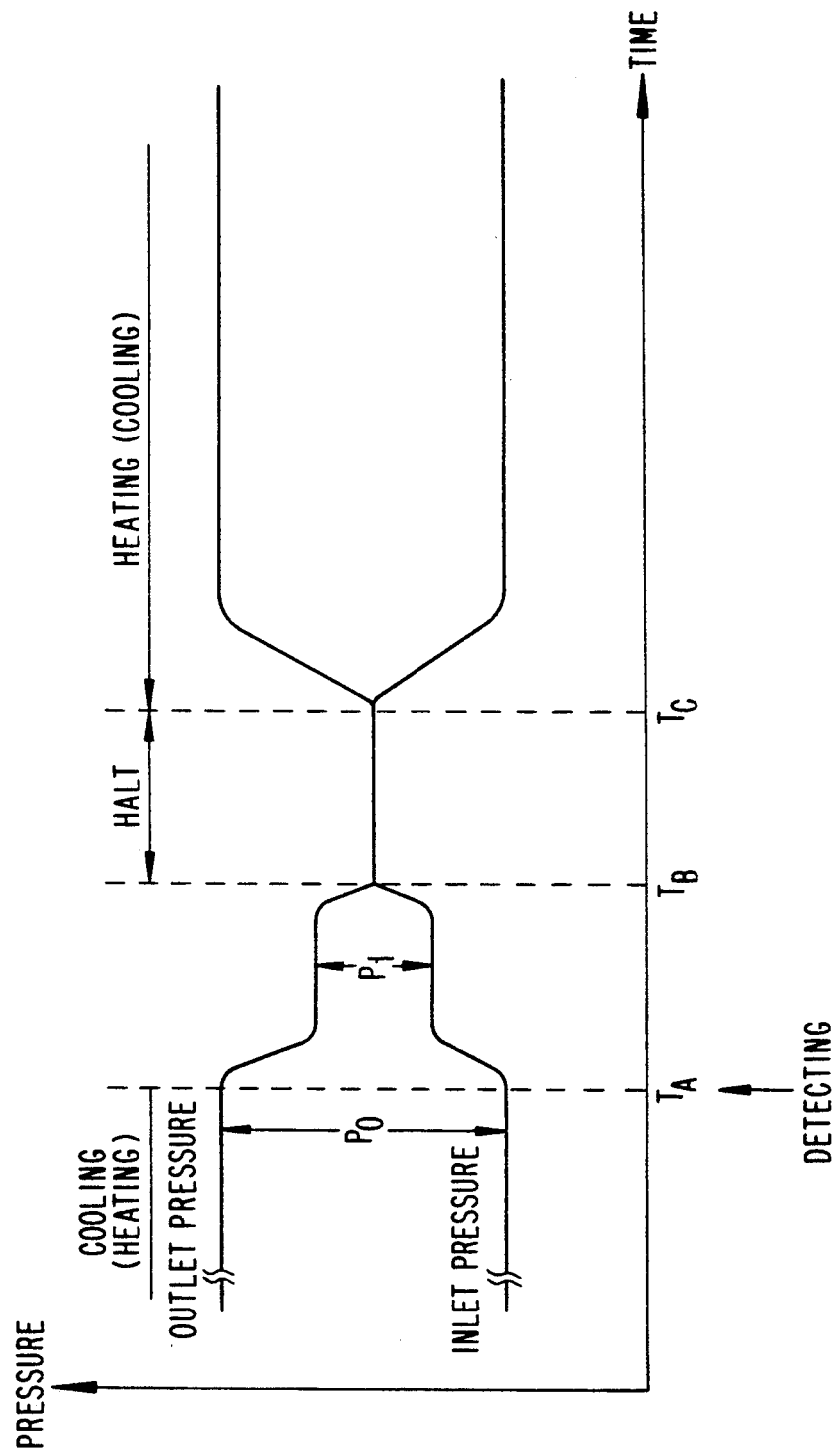
FIG. 4 depicts a second operation characteristic curve when using the invention of FIG. 2 to switch between heating and cooling modes.

When receiving an excess frost signal from temperature sensor 1' as mentioned above (point T1 in FIG. 3), microprocessor 12 actuates timer 11 to count time (step 506). After a predetermined time elapses (point T1 in FIG. 3), microprocessor 12 operates such that invertor 8 outputs an AC voltage of low frequency to compressor 5 (steps 507 and 508). Accordingly, compressor 5 drives at low speed, so that the difference between discharge pressure and suction pressure in the compressor is reduced to P1 (refer to FIG. 3). When the time of timer 1 1 reaches T2 (steps 509 and 510) microprocessor 12 sends a signal to a four-way reversing valve 4 to connect R-side and P-side with A-side and B-side thereof, respectively as shown in FIG. 2A.

At this time, the gaseous refrigerant of high temperature and high pressure which had flowed from A-side to P-side of a four-way reversing valve 4 during the heating operation before the reversal into the defrost operation flows reversely from P-side to B-side and is sucked into compressor 5, thereby being compressed therein. Therefore, the suction pressure and the discharge pressure will correspond to those of R-side and P-side of four-way reversing valve 4 during the heating operation, respectively, while they corresponded to those of P-side and R-side during the defrost operation, respectively. In the reversal into the defrost operation, the refrigerant which has flowed from compressor 5 to P-side of four-way reversing valve 4 flows through P- and B-sides of the valve to compressor 5. This refrigerant gas of high temperature and high pressure has no overloading effect on compressor 5 even if compressed therein again. This is because the pressure of the refrigerant has already been reduced to relatively low pressure P1 during the period from the time T1 to the time T2, as shown in FIG. 3. At a predetermined time T3 in the defrost operation, microprocessor 12 sends a signal to four-way reversing valve 4 to reverse the operation of compressor 5 into its heating operation mode. Simultaneously, microprocessor 12 outputs a signal to invertor 8 so that invertor 8 applies AC voltage of low frequency to compressor 5, thereby causing compressor 5 to drive at low speed for the period from the time T3 to the time T4. For the period during which compressor 5 drives at low speed, the difference between the pressure of discharge side DS and the pressure of suction side SS in the compressor is P3, as shown in FIG. 3.

After timer 11 counts the predetermined time T4 during the low speed driving of compressor 5, microprocessor 12 outputs a signal to invertor 8 so that invertor 8 applies AC voltage of high frequency to compressor 5, thereby causing the compressor to drive at high speed. At this time, the difference between the pressure of discharge side DS and the pressure of suction side SS in the compressor is PO. Thus, the operation is reversed sequentially into heating, defrosting, and heating operation modes.

Figure 6:
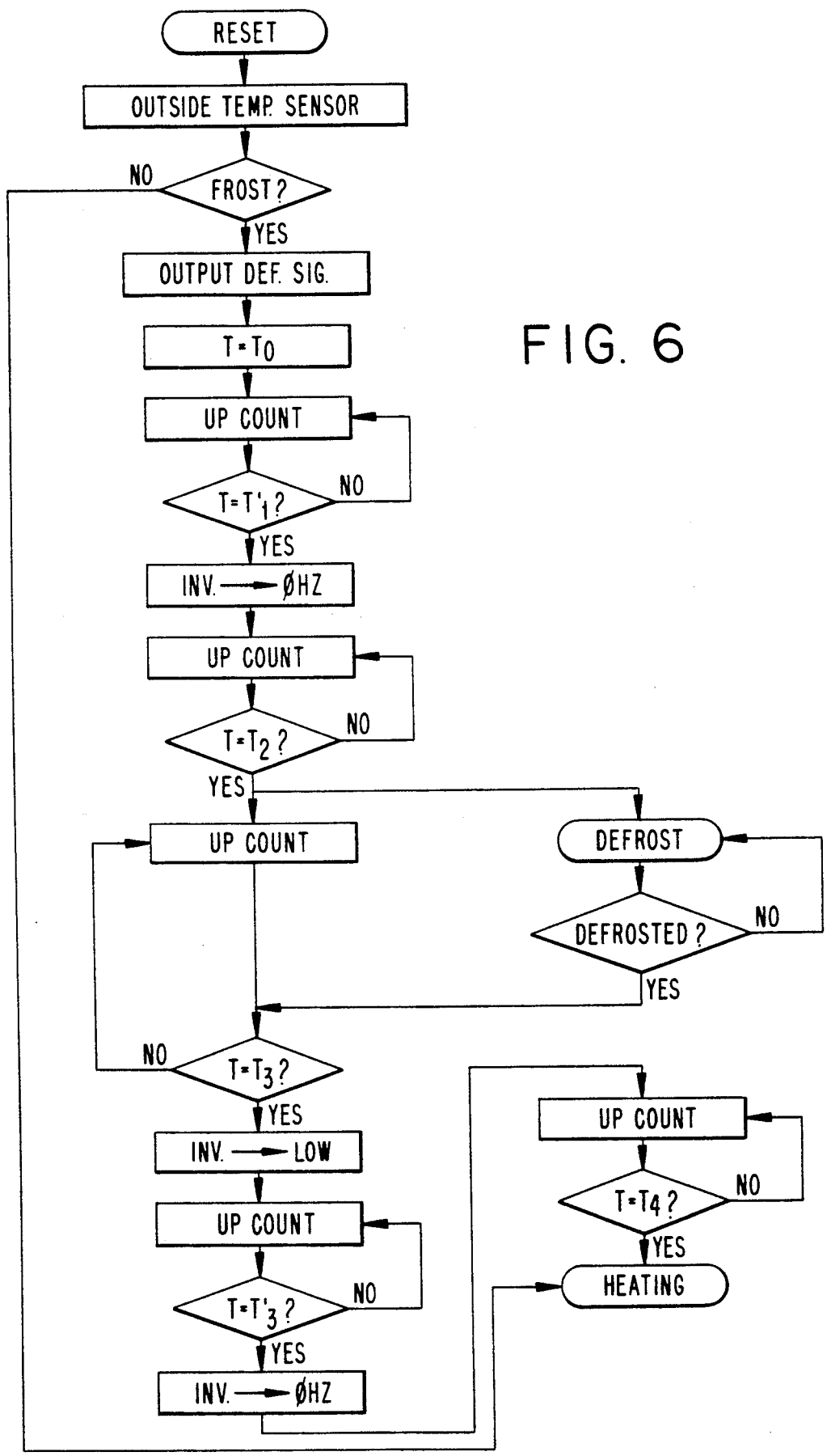
FIG. 6 is a flow chart illustrating a modified version of the FIG. 3 process.

Referring to FIG. 6, there is shown the other embodiment of the present invention which is different from the above-mentioned embodiment, in that the compressor is stopped before each reversal of operation modes.

Figure 7:
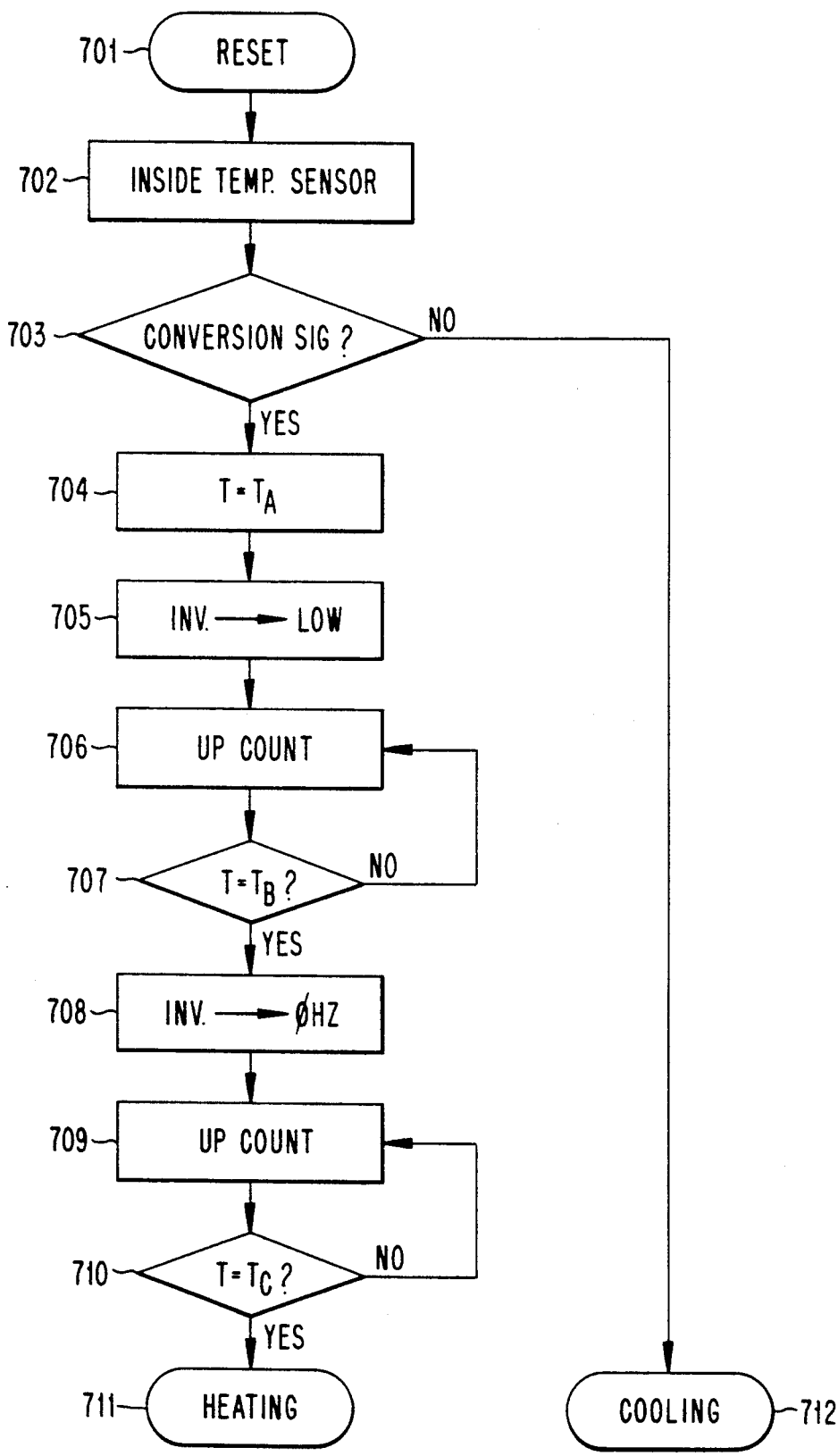
FIG. 7 is a flow chart illustrating the process of FIG. 4.

FIG. 7 which is a flow chart illustrating the process of the reversal from the heating operation mode to the cooling operation mode and vice versa shows another embodiment of the present invention.

When an operator applies electric power to the apparatus of the present invention, initializing procedure for the operation of heating mode or cooling mode is carried out in step 701. When a predetermined temperature is detected by room temperature sensor 10 provided in the room during the cooling mode operation, microprocessor 12 receives a signal corresponding to the temperature (step 702). In step 703, it is determined whether the signal is the operation mode reversal signal.

If the signal is not the operation mode reversal signal, the program proceeds to step 712 to continuously carry out cooling operation. If the signal is the operation mode reversal signal, the value TA of the timer is stored into a timer buffer T (step 704). Then, invertor 8 outputs low frequency, thereby causing compressor 5 to drive at low speed (step 705). In the next step 706, the timer counts up.

In such manner, compressor 5 drives at low speed, so that the difference between the pressure of discharge side DS and the pressure of suction side SS in the compressor is P1. In step 707, it is determined whether a predetermined time TB elapsed after the low speed driving of compressor 5. If predetermined time TB did not elapse, step 706 is repeated. If predetermined time TB elapsed, invertor 8 outputs frequency of 0 in step 708, thereby causing compressor 5 to stop. In step 709, the timer counts up. In step 709, it is determined whether a predetermined time TC elapsed. If a predetermined time TC did not elapse, step 709 is repeated. If predetermined time TC elapsed, invertor 8 applies high frequency voltage to compressor 5, thereby causing compressor 5 to operate at its heating mode (step 711).

As apparent from the above description, the invertor outputs frequency of low or 0 for a predetermined period before the reversal of operation mode, in accordance with the present invention, so that the compressor drives at low speed, thereby reducing pressure noise caused by large difference between discharge pressure and suction pressure in the compressor. As a result, it is possible to improve considerably room pleasantness obtained by the air conditioner. Furthermore, the coming of a large pressure refrigerant into the compressor can be avoided, thereby preventing the compressor from being damaged by the coming refrigerant.

What is claimed is:

1. A method of reversing the direction of an operating compressor in an air conditioning system, comprising the step of reducing the speed of said compressor to a slower speed greater than zero for a predetermined time period before reversing the direction of said compressor.

2. A method according to claim 1, wherein said reversing step initiates a heat exchanger defrosting mode of said system.

3. A method according to claim 1 including, prior to said reversing step, the steps of providing a compressor reversing signal as a function of heat exchanger temperature, and waiting a predetermined time period following said providing step before effecting said reducing step.

4. A method according to claim 1 including the steps of operating sad compressor in reverse for a second predetermined time period and then reversing said compressor a second time.

5. A method according to claim 4, wherein at the end of said second predetermined time period, said compressor is operated at a speed less than said first speed and greater than zero speed for a third predetermined period of time, said second reversing of said compressor occurring during said third predetermined period of time.

6. A method according to claim 5, wherein after said third predetermined period of time, the speed of said compressor is increased to said first speed.

7. A method according to claim 1, wherein said reducing step further comprises reducing the speed of said compressor from said lower speed to zero speed for a second period of time before reversing said compressor.

8. A method according to claim 7, wherein said reversing step changed said system between heating and cooling modes.

9. A method according to claim 8 including, prior to said reducing step, the steps of producing a compressor-reversing signal as a function of heat exchanger temperature, and waiting a predetermined time period following said producing step before effecting said reducing step.

10. An air conditioning system comprising heat exchanger means and a compressor for circulating refrigerant to said heat exchanger means, sensing means for producing a compressor-reversing signal, and compressor control means responsive to said signal for reducing the speed of said compressor to a lower speed greater than zero for a predetermined time period and thereafter reversing said compressor.

11. An air conditioning system according to claim 10, wherein said control means includes means for reducing the speed of said compressor from said slower speed to zero speed for a second predetermined time period, before reversing said compressor.

* * * * *